United States Patent [19]

Ohmori

[11] Patent Number: 4,716,533

[45] Date of Patent: Dec. 29, 1987

[54] IMAGE TRANSLATION SYSTEM

[75] Inventor: Keiji Ohmori, Yokohama, Japan

[73] Assignee: International Business Machines Corporation, Armonk, N.Y.

[21] Appl. No.: 726,263

[22] Filed: Apr. 23, 1985

[30] Foreign Application Priority Data

Apr. 27, 1984 [JP] Japan .................................. 59-84166

[51] Int. Cl.$^4$ .............................................. G06F 3/14
[52] U.S. Cl. ................................... 364/518; 340/724; 364/521
[58] Field of Search ............... 364/518, 521, 522, 443, 364/449, 424; 358/75, 78, 287, 261; 382/46, 47; 340/723, 724, 729, 747, 995

[56] References Cited

U.S. PATENT DOCUMENTS

| | | | |
|---|---|---|---|
| 4,168,488 | 9/1979 | Evans | 340/146.3 |
| 4,267,573 | 5/1981 | Chaikin et al. | 364/518 X |
| 4,494,201 | 1/1985 | Reymond et al. | 364/449 |
| 4,533,941 | 8/1985 | Keane et al. | 358/78 X |
| 4,573,201 | 2/1986 | Hashiyama et al. | 358/261 X |

*Primary Examiner*—Gary V. Harkcom
*Assistant Examiner*—H. R. Herndon

*Attorney, Agent, or Firm*—Frederick D. Poag; Joseph J. Connerton

[57] ABSTRACT

A dot pattern source image stored in a pattern memory is moved to a specified location in the pattern memory in an angle of n×90° (n=0, 1, 2, or 3) with respect to the source image. First, area definition is made for a rectangular source area including the source image to be moved and a rectangular destination area where the source area is to be positioned after the move processing. Then, the positions of four sides of the source and destination areas are compared to determine, for each side, whether there is a processable side region which is included in the destination area but not included in the source area. When such a processable side region is found along one side, the image data in a corresponding region of the source area is moved to the processable side region with a specified angle relative to the source image data. After the move processing, the source and destination areas exclusive of the moved-processed portions are redefined as new source and destination areas, and similar steps are repeated. This technique permits the use of common program control for a basic control portion of move processing regardless of whether or not the move accompanies rotation, the positional relationship between the source and the destination areas, or the rotation angle.

5 Claims, 10 Drawing Figures

IMAGE TRANSLATION SYSTEM

BACKGROUND OF THE INVENTION

1. Field of the Invention

This invention relates to an image processing system, and more particularly to an image processing system for move-processing images such as characters or graphics. This invention can be utilized in an image processing device such as a CRT graphic display using raster scanning or an image scanner/printer.

2. Prior Art

Image processing devices such as the CRT graphic displays usually use a so-called bit-mapped pattern memory that stores the dot pattern of two-dimensional image to be displayed or reproduced. The pattern memory has storage locations corresponding to the image to be displayed or reproduced, and reproduces the image by sequentially reading line dot information in synchronization with raster or line scanning of the display or printer. The image processing device often requires the ability to move the image being displayed. The image is moved with or without rotation.

One of the basic methods to move the image is to rewrite the content of the mapped pattern memory, wherein, in the past, rewriting of the dot pattern is usually performed by providing a save memory with storage capacity similar to that of the pattern memory, into which data in the pattern memory is once transferred, and then written again in the pattern memory. Although this method can be applied to any move processing, it has a problem in that it is uneconomical because it requires a save memory with large capacity.

The Japanese Laid-open Patent No. 16485/82 discloses an image display device that is arranged to rotate and move display patterns by changing the timing of pattern memory addressing relative to that of raster scanning. According to this technique, there is an advantage in that the rotation and movement of display pattern can be performed without rewriting the content of pattern memory one by one. However, if different move processing is performed for a plurality of display patterns on the same screen, it is required to separately provide a pattern memory and an address converting circuit for each display pattern, thus requiring a large quantity of hardware.

The Japanese Laid-open Patent No. 135984/82 discloses a display device that divides a pattern memory into small blocks of rows and columns, saves one block of the display pattern in a save memory in rotating the display pattern, moves into this emptied block the block to be moved to this block after the rotation, and causes the display pattern to rotate by repeating the process. Although this technique attains rotation of the display pattern by using a save memory with only a small capacity for one block, it is limited to rotation around the center of the pattern, and cannot be applied to image processing with movement.

In addition, in case where the image processing is performed by program control, a separate program is usually provided for each processing to be performed, for example, for movement without rotation, movement with rotation of 90°, movement with rotation of 180°, or movement with rotation of 270°. Each program is called according to the processing involved. However, this method makes the amount of programs enormous, and the control complicated. If the program is made common regardless of the contents of processing being performed, such advantages are obtained that the control can be simplified, and the cost can be lowered.

SUMMARY OF THE INVENTION

As described, the conventional image processing technique requires a save memory with large capacity and special hardware; otherwise it has narrow application and requires enormous amount of programs.

Therefore, an object of the invention is to provide an image processing system that can simply and economically perform the image processing by using a common control regardless of the content of move processing.

The invention performs the move processing by rewriting image data of a two-dimensional dot pattern stored in the pattern memory. The move processing is performed in an angular relation of $n \times 90°$ (n=0, 1, 2 and 3) relative to a source image. In the move processing, specified is the type of processing to be performed, namely the movement without rotation, the movement with rotation of 90°, the movement with rotation of 180°, or the movement with rotation of 270°. Also specified are the location of a source area including an image to be moved, and the location of a destination area where the source area is to be positioned after the move processing. The locations of the source and the destination areas are compared from four directions of top, bottom, right and left to determine whether, in each direction, there is any processable region which is included in the destination area but not included in the source area. When the existence of such processable region is detected, the image data in a selected region of the source area is transferred into said processable region. The region selected in the source area depends on the specified move processing. Then, the source and the destination areas exclusive of the move-processed portions are redefined as new source and destination areas, which are then determined for the processable region. Similar operations are repeated.

According to the invention, the image processing can be performed by such a common algorithm that determination is made in four directions as to whether there is any processable region in the destination area. When the existence of the processable region is determined, the image data in a corresponding region of the source area is transferred to the processable region. The basic portion of program control for the image processing can be made common regardless of whether the move accompanies rotation or not, while the positional relationship between the source and the destination area, or the rotation angle is selected, so that it is possible to make the control simple and the cost low. Control dependent on the content of move processing is required only in a front portion that performs the move processing by selecting the corresponding region from the source area according to the rotation angle, and in a second portion that performs area redefinition according to the move processing. In addition, the transfer of image data can be performed in small data blocks, and does not require a save memory of large capacity.

BRIEF DESCRIPTION OF THE DRAWINGS

FIGS. 3a–7e show various processing examples of movement with 90° rotation to the left.

DESCRIPTION OF A PREFERRED EMBODIMENT OF THE INVENTION

Figure 1:
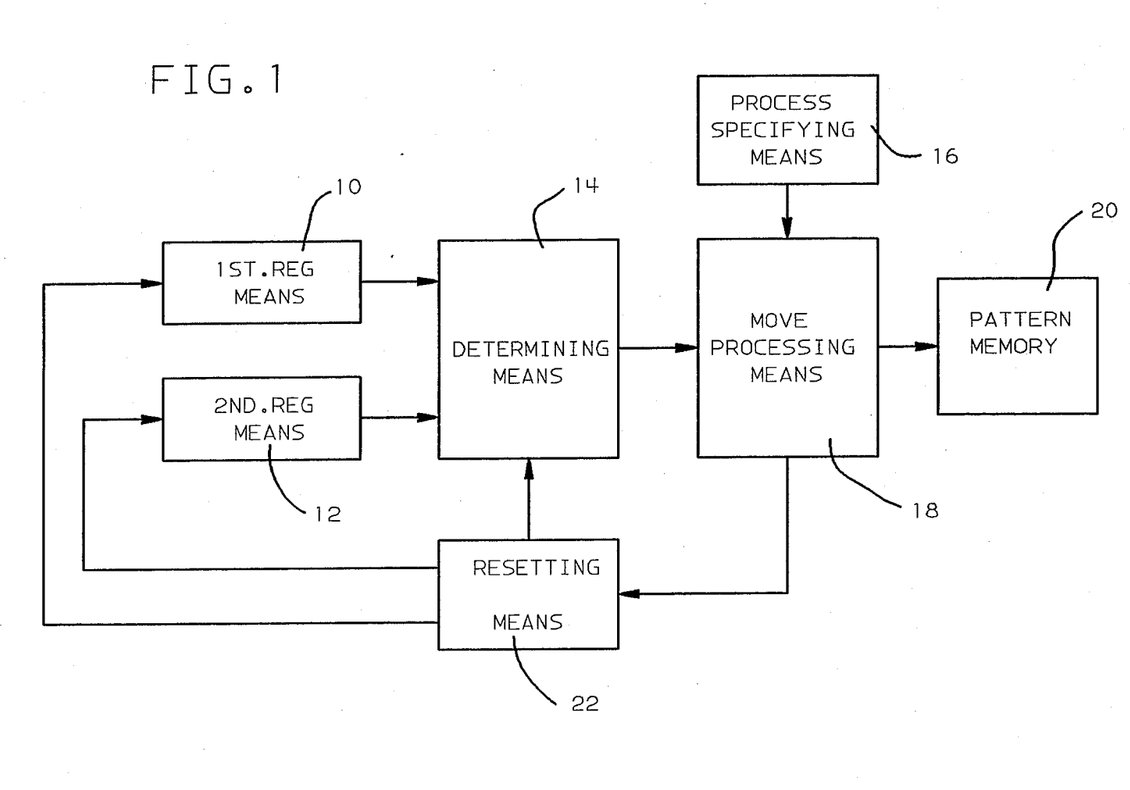
FIG. 1 shows a configuration according to the invention.

FIG. 1 shows a configuration of the invention, wherein first register means 10 hold positional data of a source area containing a two-dimensional dot pattern image in pattern memory 20 to be move-processed, while second register means 12 holds positional data of a destination area where the source area is to be transferred. Determining means 14 compares the positional relations between the source and the destination areas from four directions of top, bottom, right and left, based upon the positions held in the first and the second register means to determine, for each direction, whether there is any processable region included in the destination area but not included in the source area, and, when it is determined that there exists such processable region in any one direction, generates a signal indicating the existence of processable region relating to said direction. Process specifying means 16 specifies the type of process to be performed (movement without rotation, movement with rotation of 90°, movement with rotation of 180°, or movement with rotation of 270°). Move-processing means 18 is responsive to the signal from the determining means 14, and, in accordance with the process specified by the process specifying means 16, reads the image data in a selected region of the source area and writes it in the determined processable region of the destination area. Resetting means 22 redefines portions of the source and the destination areas exclusive of the move-processed portions as new source and destination areas and sets their positional data in the first and the second registers to cause the determining means to perform the determination for these new source and destination areas.

Figure 2:
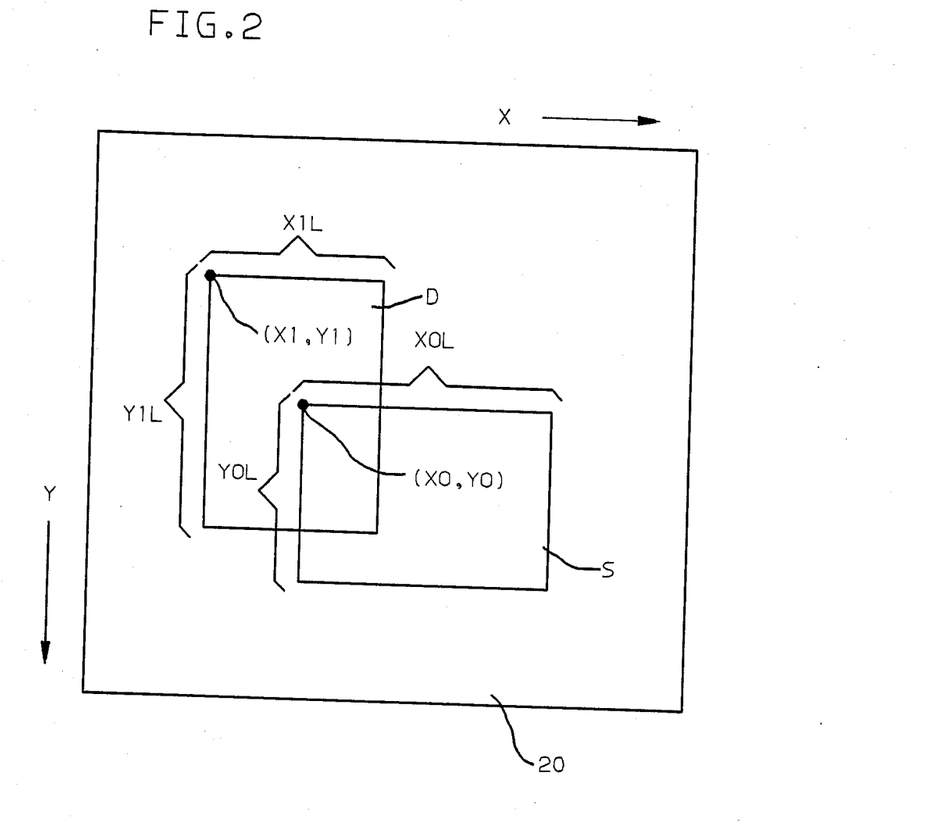
FIG. 2 shows a pattern memory.
Figure 3:
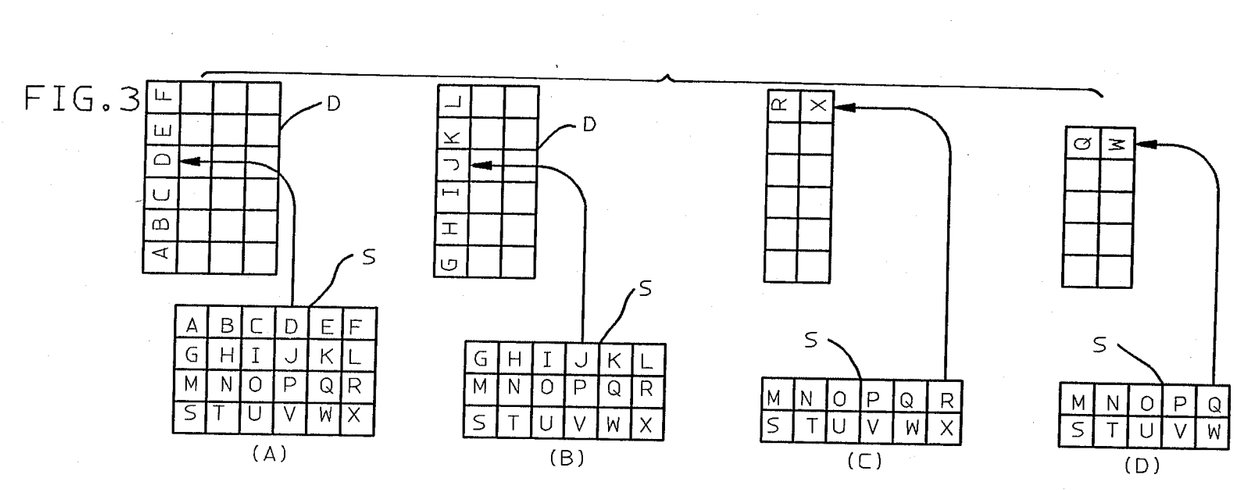

Now, examples of move processing are described by referring to FIGS. 2-7. FIG. 2 shows the pattern memory 20. The pattern memory has storage locations that correspond to dots of two-dimensional image in one-to-one relation, and is area-specifiable by horizontal and vertical positions. In this example, the coordinate of upper left corner of the pattern memory is made (0,0), while the source area S including an image to be move-processed and the destination area D are made rectangular, each of which areas is to be specified by the coordinate of its upper left corner, the horizontal width and the vertical height. The source area S is indicated by the coordinate of upper left corner (X0, Y0), the width X0L and the height Y0L, the destination area D by the coordinate of upper left corner (X1, Y1), the width X1L and the height Y1L. In this example, it is assumed that the source area S is rotated by 90° to the left and moved to the destination D.

The move processing according to the present invention follows such principle that the positions of source area S and destination area D are compared from four directions of top, bottom, right and left to determine for each direction whether there is any processable region included in the destination area D but not included in the source area S, and, when such processable region exists, the image data in a corresponding region of the source area is moved to the processable region. In this example, the search for the processable region in the destination area D is performed in the order from the left side, the upper side, the right side and the lower side.

If (X1−X0)<0, then it is determined that the left side of the area D has a processable side region included in the area D but not included in the area S.

If (Y1−Y0)<0, then it is determined that the top side of the area D has a processable side region included in the area D but not included in the area S.

If (X0+X0L)−(X1+X1L)<0, then it is indicated that the right side of the area D has such a processable side region.

If (Y0+Y0L)−(Y1+Y1L)<0, then it is indicated that the bottom side of the area D has such a processable side region.

The side region of the area S selected corresponding to each side region of the area D depends on the rotation angle as shown in Table 1.

TABLE 1

| SIDE REGION OF REGION D | SELECTED SIDE REGION OF REGION S | | | |
|---|---|---|---|---|
| | 0° | 90° | 180° | 270° |
| LEFT | LEFT | TOP | RIGHT | BOTTOM |
| TOP | TOP | RIGHT | BOTTOM | LEFT |
| RIGHT | RIGHT | BOTTOM | LEFT | TOP |
| BOTTOM | BOTTOM | LEFT | TOP | RIGHT |

The side regions of area D are searched in the order of left side, upper side, right side and lower side. If a processable side region is found, the image data in a corresponding side region of the area S is rotated by the specified rotation angle, and written in the area D. The areas S and D exclusive of the move-processed portions are redefined as new source area S and destination D. The side regions of the redefined destination area D are again searched in the sequence of left, upper, right and lower sides, and similar move-processing, redifinition, and search for side regions are repeated. Therefore, the image data in the area S is transferred to the area D through a multi-cycle operation.

In this example, the image data is processed in blocks of 16×16 bits. Therefore, the region S is moved by 16-bit length. The size of the unit processing block may be arbitrary. If the unit block is made smaller, it can attain finer movement, but requires a longer processing time. In this example, it is selected to be 16×16 bits by balancing the processing time with the movement accuracy actually required.

FIGS. 3-7 show various examples to move the area S to the area D by rotating it by 90° counterclockwise. Small squares divided in rows and columns of the areas S and D indicate the data blocks of 16×16 bits. In case of FIG. 3, in the search for the side regions of area D, it is first determined that the left side has a processable side region included in the area D but not included in the area S, and the top blocks A-F of the area S are rotated by 90° to the left, and written into the area D (FIG. 3A). The regions exclusive of the processed blocks A-F are redefined as new areas S and D, and the side regions of area D are again searched from the left side. Again, a processable side region is found in the left side, and the blocks G-L in the top side of area S are written into the area D (FIG. 3B).

After redefinition, the search is again performed from the left side of area D. However, in this cycle, no left side region is found, but a processable side region is found in the next comparison for the top side, and the blocks RX of region S are written into the top region of area D (FIG. 3C).

Then, by repeating the operation after the redefinition, the processable side region is found in the comparison for the top region in each cycle, and the blocks PV, OU, NT and MS are sequentially written into the area D to terminate the process.

Figure 4:
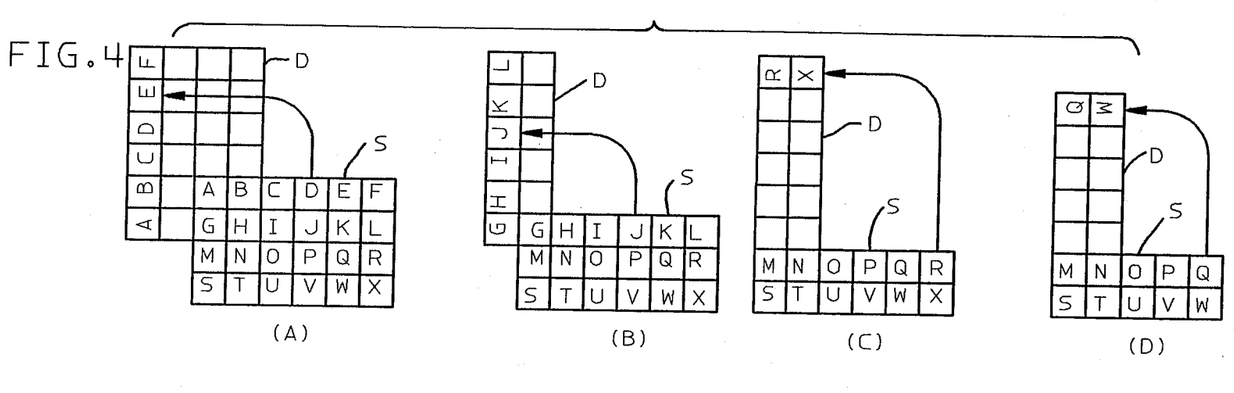

FIG. 4 shows an example in which the areas S and D are partially overlapped. The process is the same as that for FIG. 3.

Figure 5:
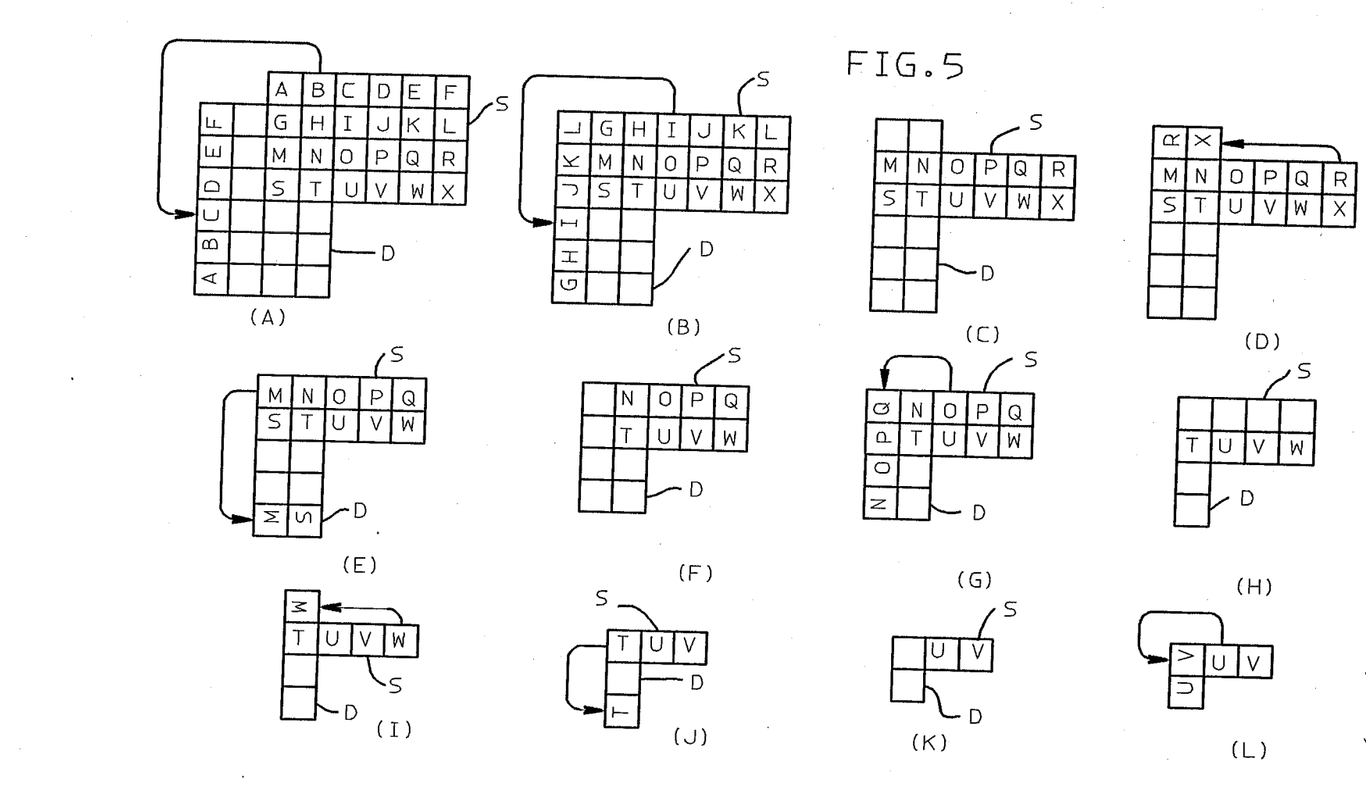

FIG. 5 shows another example in which the areas S and D are partially overlapped. In each of the cycles (A) and (B), the left side region is found, and the blocks A-F and G-L are written into the region D. In the next cycle (C), because an empty region occurs in the top side of area D by the movement of the blocks G-L, the processable side region is found in the comparison for the top side, and the blocks RX are written (D). In the next cycle (E), any side region is not found in the left, and the top and the right sides, but in the lower side, and the blocks MS are written. Because the writing of the blocks MS causes an empty region in the left side of area D (F), the blocks N-Q are written into the left side region in the next cycle (G). The movement of blocks N-Q causes an empty region in the upper side (H), and the block W is written. Similarly the entire area S is transferred to the area D by repeating the cycles (J), (K) and (L).

Figure 6:
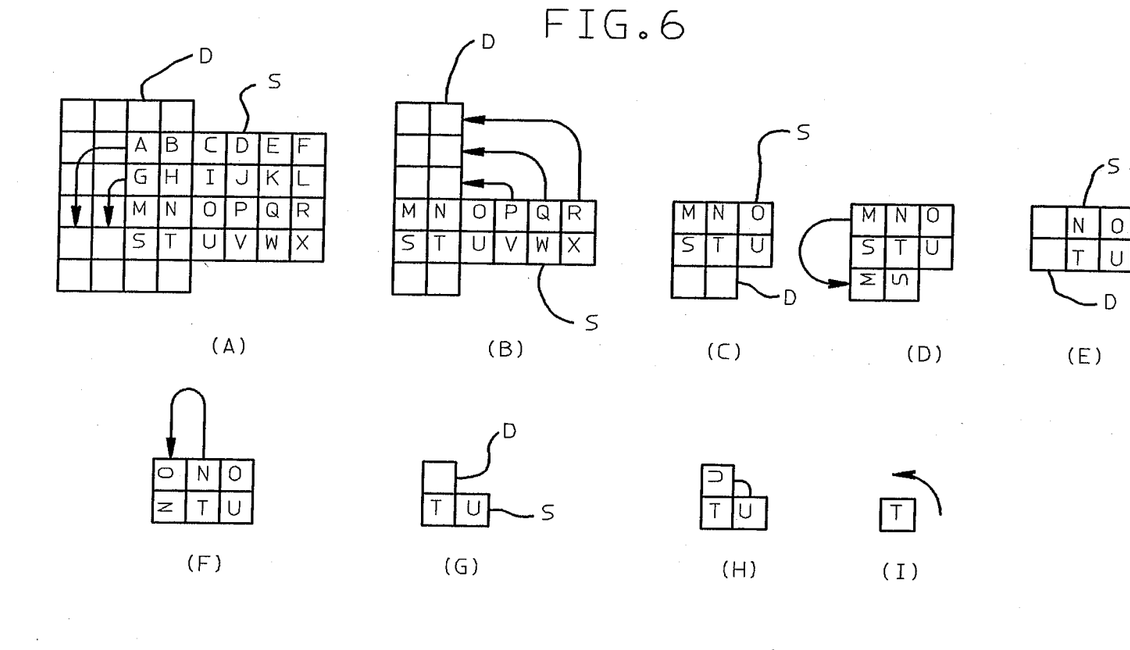
Figure 7:
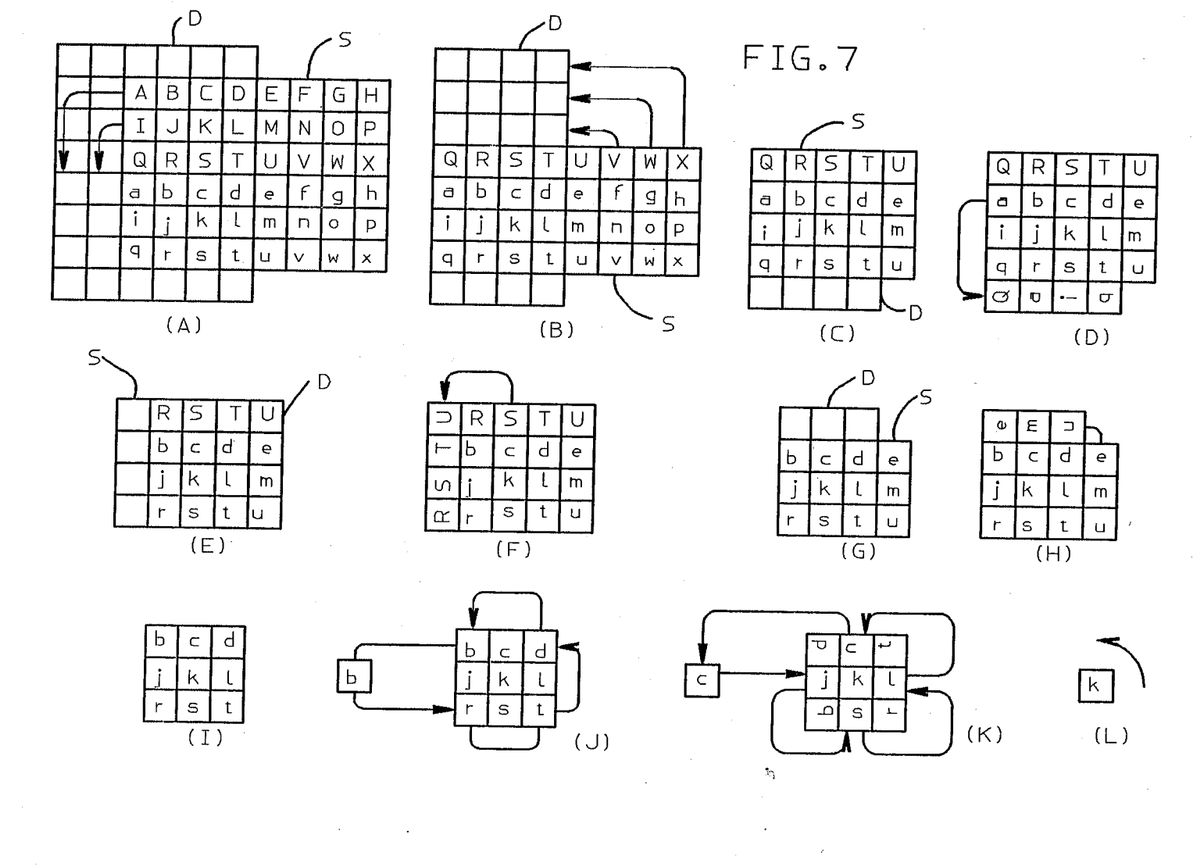

The processing actually required depends on the shape, the size and the positional relationship of the areas S and D. There may happen the case where a square is finally left depending on the overlapping condition. FIG. 6 shows an example in which one block is left; FIG. 7 another example in which a square consisting of a plurality of blocks is left. Since the intermediate processes until the square is left is apparent from the above description and the drawing, they are omitted herein. In case where block T remains as shown in FIG. 6 (I), it is sufficient to read the block T, to rotate it by 90° to the left, and to write it into the same location.

In case where a square of which one side having a length of a plurality of blocks is left, the outer blocks are subjected to periphery rotation process and a square exclusive of the processed is redefined. If the redefined square has a side consisting of blocks, such steps are repeated that the periphery rotation process is again performed, and that the redefinition is performed. If one block remains, the one block rotation process is conducted. If no block remains, the process terminates at that moment. In the case of FIG. 7, the periphery process is attained by saving the block b in the save memory as in (J), moving the block d to the location of block b, moving the block t to the location of block d and the block r to the location of block t, moving the block b in the save memory to the location of block r, then saving the block c in the save memory as in (K) to move the blocks 1, s and j to the locations of blocks c, 1 and s, respectively, and finally moving the block c in the save memory to the location of block j.

Figure 8:
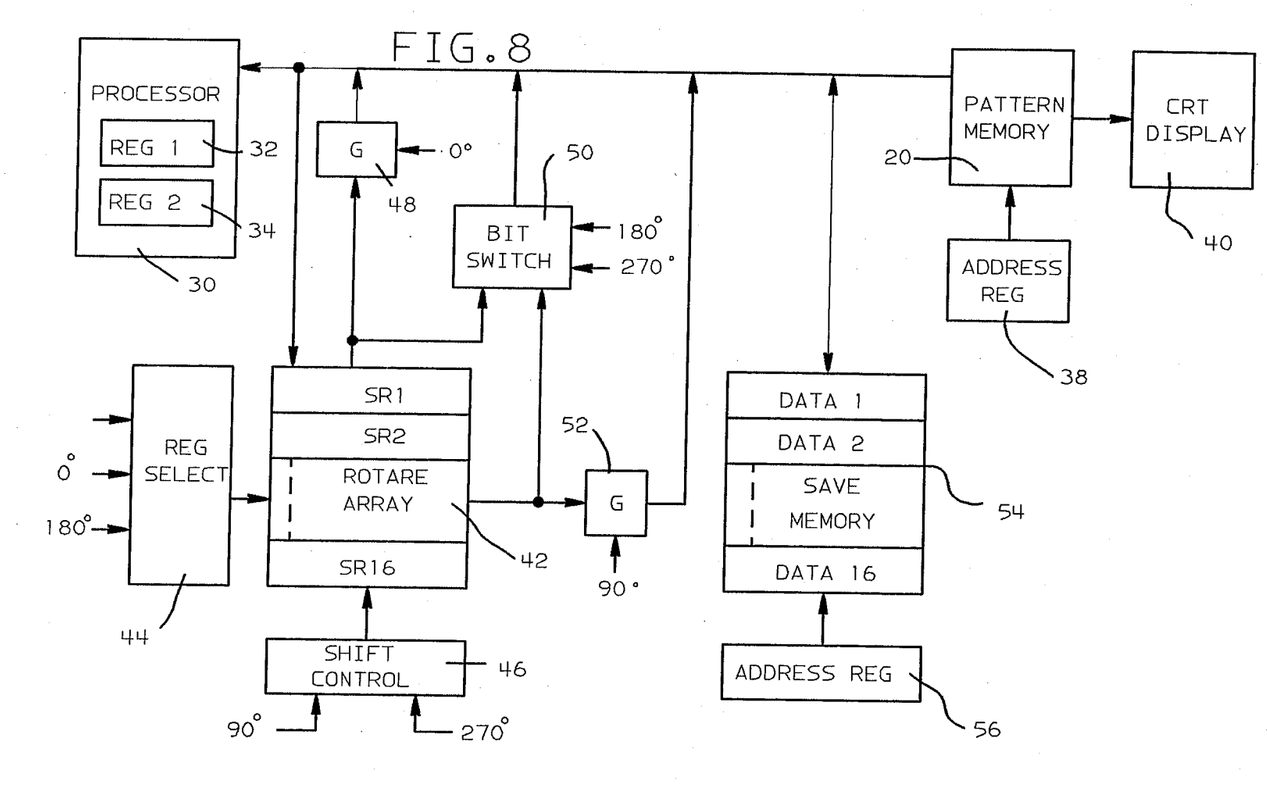
FIG. 8 shows an embodiment of the invention.

FIG. 8 shows an embodiment wherein the present invention is applied to a CRT graphic display. Microprocessor 30 includes first register 32 holding the coordinates of source area S (X0, Y0), X0L and Y0L, and second register 34 holding the coordinates of destination area D (X1, Y1), X1L and Y1L. Pattern memory 20 serves as a refresh memory stores dot pattern of a two-dimensional image to be displayed. The pattern data is read corresponding to the raster scanning of the CRT and displayed. The processor 30 reads and writes the pattern memory 20 by 16-bit words, and accesses the pattern memory 20 by providing the XY address of the 16-bit words to be accessed to address register 38.

Rotating array 42 is used to temporarily store blocks of data (sixteen 16-bit words) read from the area S, and to rotate them by a specified rotating angle. The rotating array 42 consists of sixteen shift registers SR1-SR16 that can load and fetch 16 word bits in parallel. Sixteen 16-bit words read from the pattern memory are sequentially loaded in the shift registers SR1-SR16 under the control of register selecting circuit 44. In addition, the rotating array 42 can output 16 in parallel bits at a corresponding bit location from the right of the array 42 under the control of shift control circuit 46.

If the rotating angle is 0°, sixteen words stored in the rotating array 42 are sequentially read from the shift registers SR1-SR16 under the control of the register selecting circuit 44, fed to a data bus through gate G 48, and written into the destination area D. If the rotation is 90° to the left, 16-bit words shifted from the right of the rotating array 42 are written into the destination area D through gate G 52. For 180°, similar to 0°, the words are fetched from the top of the array 42, while for 270° to the left, they are read from the right of the array 42 under the control of the shift control circuit 46. However, for 180° and 270°, the orientation of word is required to be made opposite to that in 0° and 90°, and thus the 16-bit words from the array 42 are fed to bit switch circuit 50, where bits 1-16 are converted to bits 16 - 1 and fed to the data bus.

Save memory 54 is a memory having a storage capacity for one block, and is accessed by address register 56 under the control of the processor. The save memory 54 is used for temporarily storing data for one block in the periphery processing of a square as described for FIG. 7.

Figure 9:
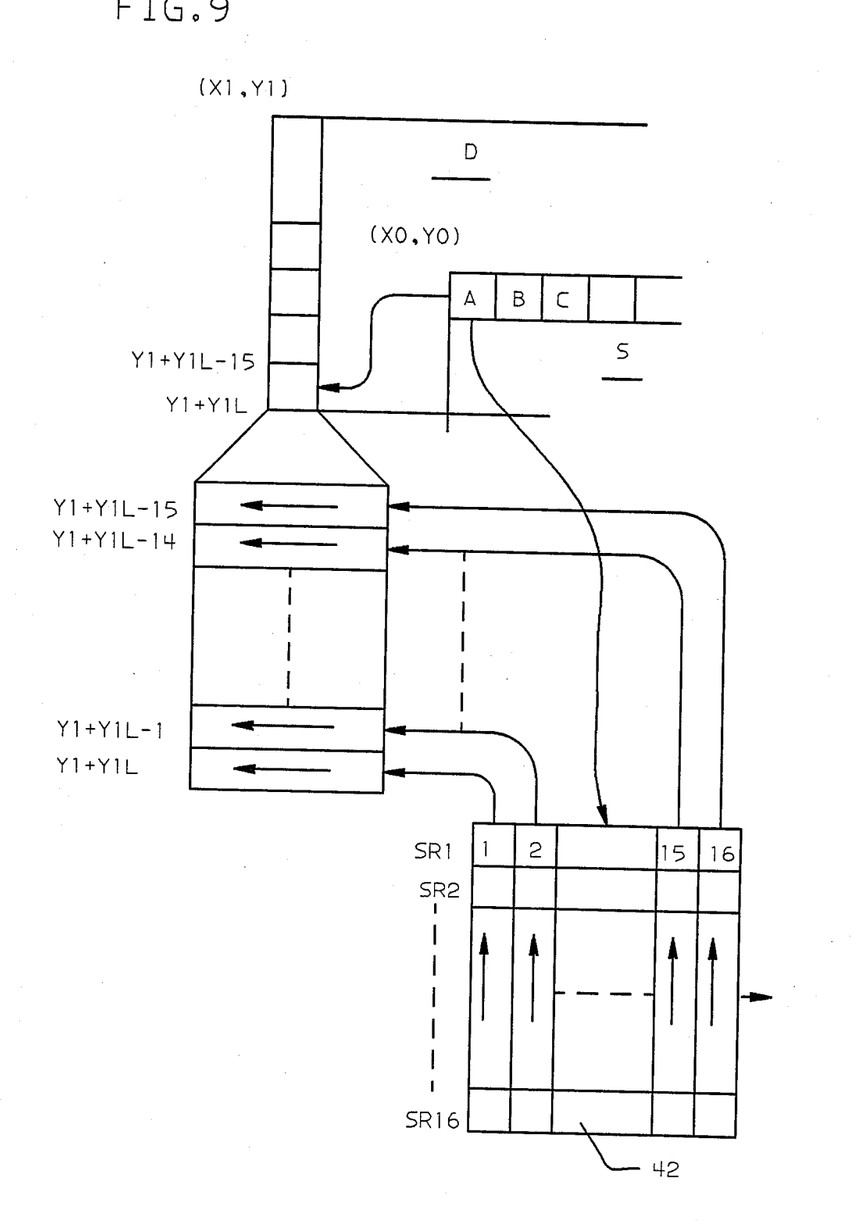
FIG. 9 exemplifies the operation of movement with 90° rotation to the left.

FIG. 9 exemplifies a process in which blocks A, B, C . . . in the top side of area S are written into the left side region of area D after rotating them by 90° to the left. Assuming that the address of the upper left corner of block A in the area S, or the address of the uppermost 16-bit word of block A is (X0, Y0), sixteen words in the block A are sequentially read by fixing the X address and changing the Y address from Y0 to Y0+15, and are parallelly loaded in the shift registers SR1-SR16 of the rotating array 42. In case of 90° rotation to the left, the data in the rotating array 42 is shifted out by the right shift. Since the block A is to be written in the lower left block of area D with its address of the upper left corner being (X1, Y1L-15), the 16-bit word at the sixteenth bit location of the rotating array 42 is written into the word location at address (X1, Y1+Y1L-15), the 16-bit word at the fifteenth bit location being written into the word location at address (X1, Y1+Y1L-14), then the 16-bit word at the second bit location being written into the word location at address (X1, Y1+Y1L-1), the 16-bit word at the first bit location being written into the word location at address (X1, Y1+Y1L).

Similarly, when the block B is moved, it is sufficient to read sixteen words in the block B by making X address X0+1, to load them in the rotating array 42, and to write them into corresponding addresses of area D (X address=X1, Y address=Y1+Y1L-31-Y1-+Y1L-16). The same rule applies for others.

In case of the periphery processing, for example, in case of FIG. 7 (J), the block b is stored in the save memory 54, the block d being loaded in the rotating array 42 and written into the location of block b through rotation of 90° counterclockwise, similarly the blocks t and r being sequentially read to the rotating array 42 and written into the locations of blocks d and t, finally the block b in the save memory being loaded in the rotating array 42 and written into the location of block r through rotation of 90° to the left. Then, in FIG. 7 (K), similar process is performed by saving the block c. The rotating process for one block k finally left is performed by loading the block k into the rotating array 42, and by writing it into the same block location through 90° rotation to the left.

Figure 10:
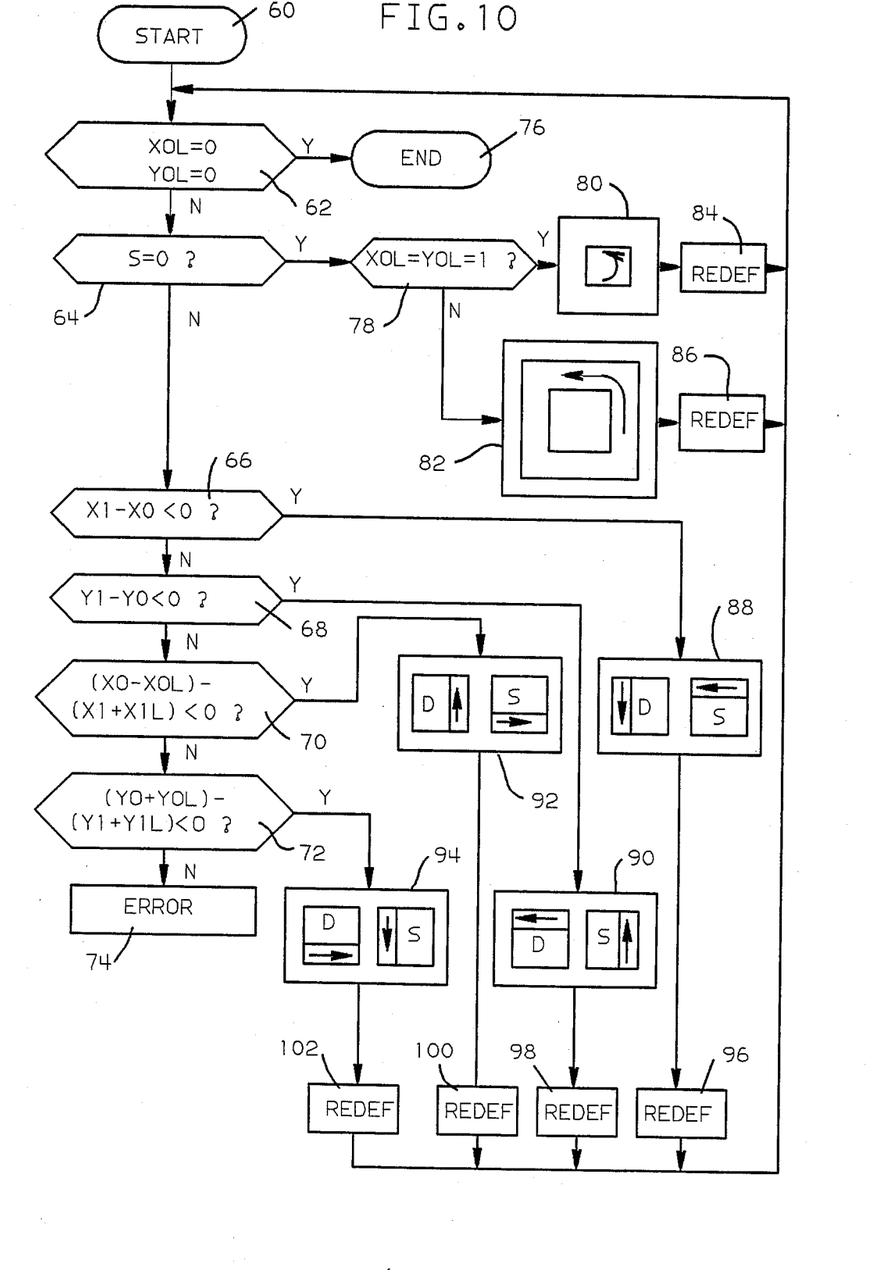
FIG. 10 shows a program flowchart for the embodiment of FIG. 8.

FIG. 10 shows a program flowchart for the rotation of 90° to the left as illustrative of the operation of the instant invention. When the rotating processing is started (Block 60), X0L=0 or Y0L=0 is checked (Block 62). If "YES", it means that there exists no area S to be move-processed, and the processing ends (Block 76). If "NO", it is checked for area S=area D, that is, whether there exists a square where area S completely overlaps area D (Block 64). If "NO", the existence of side region is sequentially checked for the left side (X1−X0<0 ?), the top side (Y1−Y0<0?), the right side {(X0+X0L)−(X1+X1L)<0} and the bottom side {(Y0+Y0L)−(Y1+Y1L)<0} of the area D (Blocks 66–72). If no side region is found in the Blocks 66–72, it is an error (Block 74). If a side region is found, the move processing is performed for one block row or column of the area S (Blocks 88–94), after which the areas exclusive of the processed blocks are redefined as new source area S and destination D, and X and Y coordinates at the upper left, the width and the height of these areas are reset in the registers 32 and 34 (Blocks 96–102). After resetting, the operation returns to the start and repeats the process. If area S= area D, check is made for X0L=Y0L=1, that is, whether the remaining square consists of single block (Block 78). If it is of single block, the single block rotation process is performed (Block 80), and the redefinition is made (Block 84). As the result of redefinition, in the next cycle, X0L=Y0L=0 will be detected in Block 62, and the operation ends. If X0L=Y0L≠1, the periphery processing is performed (Block 82), the area S and D exclusive of the periphery-processed blocks being redefined (Block 86), the operation returning to the start.

In the redefinition after one block or row column is moved, locations (X0, Y0), X0L, Y0L, (X1, Y1), and X1L, Y1L of the areas S and D are set as in Table 2. The setting of the area D is common regardless of the rotation angle.

TABLE 2

| REGION D | REGION S | | |
|---|---|---|---|
| 0° | 90° | 180° | 270° |
| LEFT SIDE | | | |
| X1 + 1 | X0 + 1 | X0 | X0 | X0 |
| Y1 | Y0 | Y0 + 16 | Y0 | Y0 |
| X1L − 1 | X0L − 1 | X0L | X0L − 1 | X0L |
| Y1L | Y0L | Y0L − 16 | Y0L | Y0L − 16 |
| TOP SIDE | | | |
| X1 | X0 | X0 | X0 | X0 + 1 |
| Y1 + 16 | Y0 + 16 | Y0 | Y0 | Y0 |
| X1L | X0L | X0L − 1 | X0L | X0L − 1 |
| Y1L − 16 | Y0L − 16 | Y0L | Y0L − 16 | Y0L |
| RIGHT SIDE | | | |
| X1 | X0 | X0 | X0 + 1 | X0 |
| Y1 | Y0 | Y0 | Y0 | Y0 + 16 |
| X1L − 1 | X0L − 1 | X0L | X0L − 1 | X0L |
| Y1L | Y0L | Y0L − 16 | Y0L | Y0L − 16 |
| BOTTOM SIDE | | | |
| X1 | X0 | X0 + 1 | X0 | Y0 |
| Y1 | Y0 | Y0 | Y0 + 16 | Y0 |
| X1L | X0L | X0L − 1 | X0L | X0L − 1 |
| Y1L − 16 | Y0L − 16 | Y0L | Y0L − 16 | Y0L |

Although the move processing for 0°, 180° and 270° are not described in detail, it will be apparent because it is sufficient to perform the side region processing for the left side, the top side, the right side and the bottom side of the area D in accordance with Table 1.

Although specific examples have been described in the above, various modifications may be made within the scope of the invention. For example, the embodiment accesses the pattern memory 20 with the XY addressing, but the linear addressing that assigns continuous addresses to words or unit access data may also be used. In addition, although the rotating array 42 is shown as one at the upper side of which the load/fetch is performed, and from the right of which the shifting-out is performed, such arrangement may be used that the fetch is performed from the lower side of the array, that the shifting-out can be made from the left of the array, or that the shifting can be performed in both left and right directions. According to this, the direction of increase and decrease of Y address will be selected in the writing of the pattern memory. In addition, the search for the side region of the area D is not limited to the specific sequence of left, top, right and bottom, but may be performed in any sequence. Furthermore, if the pattern memory contains a plurality of images, and a rectangular source area S surrounding a processed image overlaps other image, the processed image may be moved in a plurality of steps by dividing it into a plurality of image sections, to each of which a source area is set; otherwise, it would also be possible to perform the move processing by specifying the coordinates for the source and the destination areas in a form of partially notched rectangular, although the program becomes somewhat complicated.

According to the invention, since the move process can be performed by a common algorithm of determining the processable region of the destination area regardless of whether the move processing to be performed accompanies rotation or not, the positional relationship between the source and the destination areas, or the rotation angle, the control can be significantly simplified, and it is economical because a save memory with large storage capacity is not required.

What is claimed is:

1. For execution by an image processing system for rotating by n×90° (n=1, 2, 3) an image of a rectangular source area in a memory and moving the image to a rectangular destination area partly overlapping the source area, the method which comprises:
   (a) scanning the source and destination areas for each of four sides (upper, lower, left and right) in a predetermined order to find whether the destination area includes a non-overlapping sub-area which is positioned along the side and not included in the source area,
   (b) if such a destination sub-area is found for a side, rotating and moving data from the corresponding source sub-area to the destination sub-area, and (c) redefining the source and destination areas exclusive of the processed sub-areas as new source and destination areas.

2. A method in accordance with claim 1 wherein said method defined in claim 1 further includes repeating the steps (a)-(c).

3. An image processing system for rotating an image of a rectangular source area in the memory by $n \times 90°$ (n=1, 2, 3) and moving the image to a destination area in the memory partly overlapping the source area, comprising:
   an image memory for storing image data,
   first register means for storing coordinate values which define the source area,
   second register means for storing coordinate values which define the destination area,
   means connected to said first and second register means for scanning the source and destination areas for each side to find whether the destination area includes a non-overlapping sub-area which is positioned along the side and not included in the source area,
   means responsive to the finding of said sub-area by said scanning means for rotating data at the corresponding source sub-area and moving the data to said destination sub-area,
   means for resetting said first and second register means to redefine the source and destination areas exclusive of the processed regions as new source and destination areas, and
   means for continuing said scanning, rotating and moving, and resetting operations so far as said non-overlapping sub-area is found in said new destination area.

4. A method of performing move processing in a graphic image apparatus which comprises:
   rewriting image data of two-dimensional dot pattern stored in a pattern memory,
   specifying the type of processing to be performed, namely the movement without rotation, movement with rotation of 90°, the movement with rotation of 180°, or the movement with rotation of 270°,
   specifying the location of a source area including an image to be moved, and the location of a destination area where the source area is to be positioned after the move processing,
   comparing the locations of the source and the destination areas from four directions of top, bottom, right and left to determine whether, in each direction, there is any processable region which is included in the destination area but not included in the source area,
   when the existence of such processable region is detected, transferring the image data in a selected region of the source area into said processable region, and
   redefining the source and the destination areas exclusive of the move-processed portions as new source and destination areas, which are then compared to determine a said processable region.

5. An image processing system for moving a dot pattern image stored in a pattern memory with storage locations corresponding to a two-dimensional image to be reproduced to a specified area in said pattern memory in a relation making an angle of $n \times 90°$ (n=0, 1, 2 and 3) to said image, comprising:
   first register means for holding positional data of a source area containing the dot pattern image to be processed,
   second register means for holding positional data of a destination area to said source area,
   means for specifying the process to be performed,
   determining means for comparing the positions of said source and said destination areas from four directions of top, bottom, left and right based upon the positional data in said first and second register means to determine for each direction whether there is a processable region included in said destination area but not included in said source area and, when it is determined that there exists said processable region in said destination area in any one direction, generating a signal indicating the existence of the processable region in said direction,
   move-processing means responsive to said signal for reading the image data in a selected region of said source area and writing it into said determined processable region of said destination area in accordance with the specified process, and
   resetting means for resetting portions of said source and said destination areas exclusive of the move-processed portions in said first and second register means as new source and destination areas and causing said determining means to perform the determination for said new source and destination areas.

* * * * *